Nov. 23, 1954

W. M. COOPER 2,695,015

WORK-SUPPORTING CARRIAGE FOR MASONRY SAWS

Filed June 26, 1952

INVENTOR.
WILLIAM M. COOPER
BY Terry and Cohn
ATTORNEYS

Nov. 23, 1954  W. M. COOPER  2,695,015
WORK-SUPPORTING CARRIAGE FOR MASONRY SAWS
Filed June 26, 1952  2 Sheets-Sheet 2
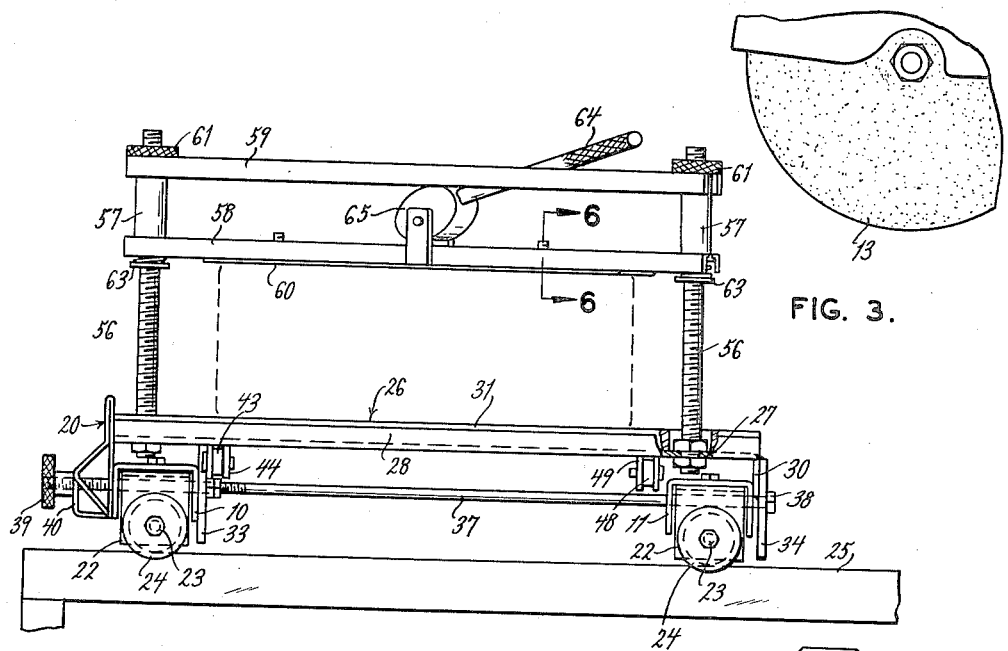
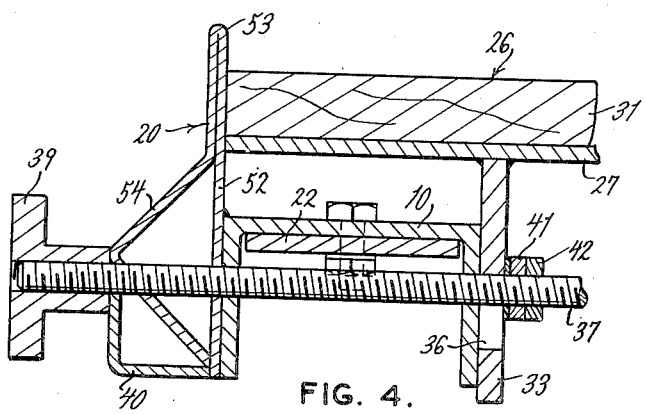
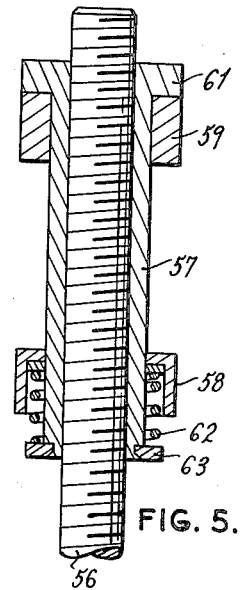
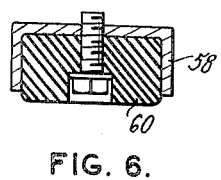
INVENTOR.
WILLIAM M. COOPER
BY Terry and Cohn
ATTORNEYS

United States Patent Office 2,695,015
Patented Nov. 23, 1954

2,695,015

WORK-SUPPORTING CARRIAGE FOR MASONRY SAWS

William M. Cooper, Sappington, Mo., assignor to Champion Manufacturing Company, St. Louis, Mo., a corporation of Missouri Application June 26, 1952, Serial No. 295,738

3 Claims. (Cl. 125—13)

This invention relates to improvements in work-supporting carriages for masonry cutting machines, and more particularly to an improved cart for holding the work object in various angular positions and for moving the object with respect to a cutting blade.

There have been developed heretofore, work-supporting carriages arranged for reciprocating movement beneath the blade members of masonry saws. One type of work carriage includes a swingable panel having an end margin located closely adjacent the cutting blade when the panel is horizontally disposed, but which end margin becomes displaced from the blade when the panel is swung upwardly in an arc about its pivot axis. It is inherent in the structure of this type of carriage that any advantage afforded by the margin as a reference line, and as a work support close to the cutting zone, is lost when the panel is pivotally displaced from the horizontal. Thus, it is obvious that the panel margin which normally lies adjacent to the blade, cannot conveniently be relied upon as a reference edge and as an aid when positioning the work object, when it is desired to make an angular cut. This tends to hamper the operation of severing masonry at oblique angles since the length of that portion of the work piece projecting over the margin will have to be readjusted relative to the plane of the blade while the panel is maintained in the angular position required for the desired cut. It is accordingly a major and principal objective of the present improvements to obviate the recognized inadequacies and disadvantages of equipment of the types noted, and to realize a work-supporting cart in which a reference margin is disposed closely adjacent the plane of the masonry-cutting blade in all angular positions of the tiltable panel.

A further important objective is realized by a camming mechanism including a camming element and a cam follower interconnecting the angularly movable work-supporting panel and the supporting frame of the carriage, the camming mechanism being adaptable to cause a reference margin to move in a substantially vertical plane upon angular displacement of the panel.

Another important and useful objective of the present improvements is afforded by a locking means interconnecting the supporting frame and tiltable panel, and operable on the cam and cam follower to retain the panel in any selected angular position.

A still further important and valuable object is realized by a linkage means, and a camming mechanism including a cam and cam follower operatively interconnecting the tiltable panel and the supporting frame, whereby a margin of the panel is reciprocally displaced in a substantially vertical plane adjacent the plane of the cutting blade incident to angular actuation of the panel, thus adapting the margin for use as a reference line in any panel position.

The foregoing and numerous other objects of the invention will more clearly appear from the following detailed description of a preferred embodiment, particularly when considered in connection with the accompanying drawings, in which:

Fig. 3 is an end elevational view showing the work-supporting cart mounted on track elements for reciprocating movement beneath a masonry-cutting blade;

Fig. 4 is an enlarged sectional view as taken along line 4—4 of Fig. 1;

Fig. 5 is an enlarged sectional view as taken along line 5—5 of Fig. 1, and

Fig. 6 is an enlarged sectional view as taken along line 6—6 of Fig. 3.

Figures 1, 2:
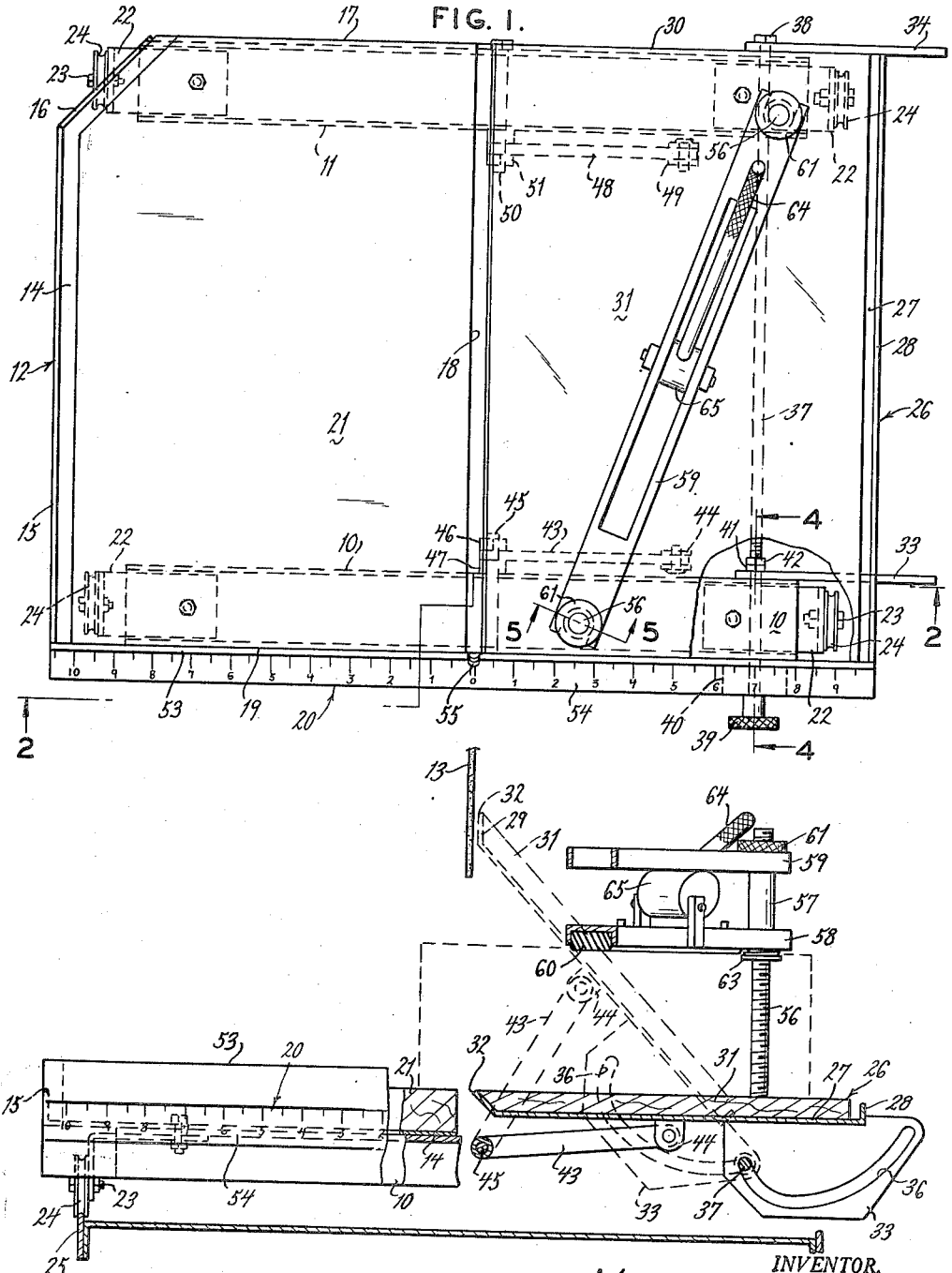
Fig. 1 is a top plan view of the work-supporting cart.
Fig. 2 is a front elevational view, partly in section as taken along staggered line 2—2 of Fig. 1, the dashed lines showing the cam-plate, link elements and movable panel in a raised position.

Referring now by characters of reference to the drawings, a pair of inverted U-shaped channels 10 and 11 arranged in spaced parallel relation provides a supporting frame. Horizontally disposed and secured on the flat upper faces of channels 10 and 11 is a stationary work-supporting panel 12, the panel 12 being located on one side of the plane of the masonry-cutting blade 13, shown in Fig. 2, as to overlie approximately one-half the length dimension of the channels 10 and 11. The stationary panel 12 consists of a flat, base portion 14 formed from a sheet metal material having upturned flanges 15 and 16 constituting, respectively, the outer end margin and the outer corner margin, a down-turned flange 17 forming the rear margin and positioning contiguous with the outer arm of channel 11, and straight edges 18 and 19 respectively forming a margin closely adjacent the plane of the blade 13 and a forward margin which abuts an angulate scale-bearing strip generally referred to at 20 and later fully described. A wood top portion 21 having a similar general configuration as the metal base portion 14 is secured to the base 14 with the respective straight edges of the wood top 21 in vertical alignment with the downturned flanges 17 and the straight edges 18 and 19 of the base, but being slightly spaced from the upturned flanges 15 and 16.

Angle plates 22 are bolted to the channels 10 and 11 at each open end portion, the depending leg of each angle plate 22 carrying a pivot pin 23. A peripherally grooved wheel 24 is connected to each pin 23, thus adapting the work-supporting carriage to be reciprocally movable on track elements 25 to and from a work-cutting position beneath the blade 13 shown in Figs. 2 and 3.

An angularly movable panel 26 is located over channels 10 and 11 on the opposite side of the plane of the cutting blade 13. Panel 26 includes a base portion 27 formed of a flat piece of sheet metal having a vertically upturned outer end flange 28, an obtusely upturned inner flange 29, and a depending rear flange 30. Secured to the metal base portion 27 is a wood platform 31 that constitutes the top portion of the movable panel 26, the respective edges of the top wood platform 31 being aligned with the edges of the metal base portion 27, but being slightly spaced from the vertically upturned end flange 28. The obtusely upturned flange 29 and overlying wood top 31 provide a sharply defined reference margin 32 located closely adjacent and parallel to the plane of the blade. With the movable panel 26 in a horizontal position, the top faces of the panels 12 and 26 lie in substantially the same horizontal plane, hence providing a level work-supporting table top.

Of course, under the principles disclosed herein, any line on panel 26 parallel to the plane of the blade 13 may be adapted for use as a reference edge as determined by the relation of the link elements and camming mechanism subsequently described. In addition, each of the panels 12 and 26 may be of one piece construction. The above description of the preferred construction of the panels and reference margin 32 is to be understood in an informative sense, and is not intended to be restrictive.

A pair of camming members or cam-plates 33 and 34 are secured edgewise, as by welding, to the metal base portion 27 of the angularly movable panel 26, each cam plate being arranged in a vertical position and located adjacent one arm portion of channels 10 and 11. From Fig. 1, it is apparent that camming member 33 is disposed adjacent the inner arm of channel 10, and the other camming member 34 is located adjacent the outer arm of opposed channel 11. Each of the camming members 33 and 34 are of the same angulate configuration, with a heel portion extending outwardly beyond the end flange 28 of the tiltable panel 26, each member 33 and 34 further including a camming slot 36 of identical curvilinear construction.

Positioning in aligned circular apertures provided in the arm portions of frame channels 10 and 11 is a cam-following rod or shaft 37, the cam follower 37 being terminated at the rear end by a retaining nut 38 that normally lies contiguous with cam plate 34, and being provided with threads on the opposite end portion. The cam rod positions in the camming slot 36 of each camplate. Fig. 4 reveals an adjustment knob 39 having a threaded bore received on the projecting threaded end of the cam follower 37, the knob 39 normally abutting a right angle member 40 secured to the outer angulate portion of the scale-bearing strip 20. In addition, a pair of contiguous locking nuts 41 and 42 are threaded on the cam-following rod 37, and are located to the right of cam-plate 33, as viewed in Fig. 4. Obviously, as the knob 39 is tightened on rod 37, the rod is shifted to the left (Fig. 4), thus operatively clamping locking nuts 41 and 42, cam-plate 33 and channel 10, and at the same time moving retaining nut 38 into clamping engagement with cam-plate 34 and channel 11. Upon release of the knob 39, the aforesaid parts are disengaged, hence releasing the movable panel 26 for subsequent angular displacement.

A link element 43 is pivotally connected at one end portion to the tiltable panel 26, the link 43 being secured between spaced arms of a U-shaped lug 44 dependingly carried by the metal base 27 of panel 26 at a point forwardly of the cam-plates. The opposite end of the link element 43 is pivotally connected to the supporting frame by a bolt 45 extended through the spaced arms of channel 10, the link end being disposed on the bolt 45 between a nut 46 and a boss 47 formed on the inner arm of channel 10. In a similar manner, a second link element 48 is pivotally connected to channel 11 and the angularly movable panel 26 by lug 49 and by bolt 50 and nut 51. The pivotal axes provided by the bolts 45 and 50 are located slightly to one side of the plane of the cutting blade 13.

As the movable panel 26 is angularly tilted from a horizontal position, as shown by the full lines in Fig. 2, to the fully raised position, shown by the dashed lines in Fig. 2, the cam-plates 33 and 34 move forwardly and upwardly with the attached panel. Being retained by the supporting frame channels 10 and 11, the cam follower 37 remains stationary but coacts in camming slots 36 to urge the movable panel 26 in a predetermined path of travel, the link elements 43 and 48, cam-plates 33 and 34 and follower 37 cooperating to cause the reference margin 32 to move in a substantially vertical plane upon actuation of the panel.

The angulate strip 20 is preferably of one piece construction, and provides a vertical face 52 (Fig. 4) which abuts the forward edges of each panel 12 and 26 and the outer arm of channel 10. The upper portion of the strip 20 is reversed to form an upstanding lip or flange 53 that extends above the top level of the panels, the strip then extending outwardly to form a right angular formation of which the upper inclined surface 54 may be used to carry a scale, as best illustrated in Figs. 1, 2 and 4. An intermediate groove or kerf 55 is provided in the upper lip or flange 53 in the region separating the panels 12 and 26, or in other words at the plane of the cutting blade 13.

Any of the conventional clamping devices may be used to hold the work piece in position on the tiltable panel, but for completeness of disclosure, the clamp used includes two vertical posts 56 provided with threads. Threadedly received by the posts 56 are sleeve elements 57, shown best in Fig. 5, which carry a pair of normally spaced clamping bars 58 and 59 formed from inverted channel elements, the lower bar 58 having an insert member 60 detachably secured thereto that overlies the work piece. Bar 59 abuts collars 61 on the adjustable sleeves, and bar 58 engages compression springs 62 seated on shoulders 63. A handle 64 which projects through an elongate aperture in the upper channel 59 provides a camming element 65 pivotally secured to the lower clamping bar 58. Movement of handle 64 cams the lower bar 58 against the action of springs 62, thus securely holding the work piece on the panel 26 until released by reverse camming action of the handle.

The operation and function of the work-supporting cart is thought to have become fully apparent from the foregoing detailed description, but in the interest of further clarity and completeness of disclosure, it will be noted that as the movable panel 26 is angularly displaced from the horizontal position to a fully raised position, the reference margin 32 located closely adjacent the plane of the blade 13 will move in a substantially vertical plane. Of course, the camming slots 36 are formed with a predetermined curvature such that the cam follower 37 coacting therein, and the link elements 43 and 48 pivotally interconnecting the panel 26 and supporting frame, will regulate the course of travel of the reference margin 32 incident to tilting actuation of the panel.

With panel 26 in a horizontal position, the work piece may be placed on the panels 12 and 26 and adjusted as to the length extending under the cutting blade 13. The reference margin 32 may be used to determine the precise point where the plane of cut will emerge from the bottom of the work piece. If an oblique cut is required, the work piece is clamped firmly in position on the panel 26, and panel 26 displaced to the correct angular position in the above described manner. In any angular position of panel 26, the reference margin 32, and consequently the lowest point of cut, will not have shifted in any respect relative to the plane of the blade 13, hence eliminating the heretofore necessary readjustment of that length of masonry extending under the blade after the panel is displaced to an angular position. It is obvious that the initial adjustment of the work piece relative to the blade 13 does not have to be done with panel 26 in a horizontal position, but it may be accurately accomplished with the panel in any angular position.

In the particular arrangement shown, after the piece of masonry is clamped in the desired position, the cart is pushed along the track 25 until the cutting blade 13 operatively engages and completely severs the piece. The cart is then moved back along the track clear of the blade, and the work piece removed.

Although the improvements have been described by making particularized reference to a single preferred embodiment, the detail of description is not be be understood as restrictive, numerous variants being possible within the principles disclosed and within the fair scope of the claims hereunto appended.

I claim as my invention:

1. In a masonry saw having a rotary cutting disc, a carriage adapted for rectilinear movement in a path parallel to the plane of said disc, said carriage including a frame structure, a work-supporting panel arranged thereon with its forward margin in close parallel proximity to the plane of said cutting disc and its rear margin spaced therefrom, means mounting said panel for pivotal and bodily adjustment on and with respect to the carriage frame structure, said means comprising a bar link pivotally connected to said frame structure at a fixed point adjacent to the plane of the cutting disc, and pivotally connected to the panel at a fixed point between the forward and rear margins of the said panel, a cam member having an arcuate slot, and a pin disposed for guided sliding movement in said slot, said cam and pin assembly connecting the rear marginal portion of said panel to said frame structure and coacting with said link to maintain the forward margin of said panel in close parallel proximity to the plane of the cutting disc in all angular positions of the panel.

2. In a masonry saw including a rotary cutting disc, a carriage movable in a path parallel to the plane of said disc, said carriage having an angularly adjustable work-supporting panel arranged to have its forward margin disposed at all times in close parallel adjacence to the plane of said cutting disc and the opposite or rear margin spaced therefrom, a frame structure for said panel, pivotal mounting means for said panel comprising a pair of parallel link bars disposed at opposite sides of said panel, each of said bars having one end pivotally attached to said frame structure at a point closely adjacent to the plane of the cutting disc and the opposite end pivotally attached to said panel at a point between the forward and rear margins thereof, and cam and follower means slidably connecting the rear marginal portion of said panel to said frame structure, said cam and follower means cooperating with said links to maintain the forward margin of said panel substantially equidistant from the plane of the cutting disc in all angular positions thereof.

3. In a masonry saw, including a rotary cutting disc, a carriage as described in claim 2, wherein said cam and follower means comprise a plate secured to the rear portion of the panel, said plate having a guide slot therein, a rod mounted on the carriage frame structure and extending through said slot, and a clamping nut threadedly disposed on said rod and engageable with said plate to secure said plate against movement relative to said rod.

References Cited in the file of this patent

UNITED STATES PATENTS

| Number | Name | Date |
|---|---|---|
| 1,244,584 | Carter | Oct. 30, 1917 |
| 1,387,646 | Hansen | Aug. 16, 1921 |
| 1,390,828 | Smith | Sept. 13, 1921 |
| 2,464,117 | Coates | Mar. 8, 1949 |